United States Patent
Hayman, III (10) Patent No.: US 7,978,806 B1
(45) Date of Patent: Jul. 12, 2011

(54) SEAFLOOR POWER STATION

(76) Inventor: W. Z. (Zack) Hayman, III, La Jolla, CA (US)

(*) Notice: Subject to any disclaimer, the term of this patent is extended or adjusted under 35 U.S.C. 154(b) by 1308 days.

(21) Appl. No.: 11/234,460

(22) Filed: Sep. 23, 2005

Related U.S. Application Data (63) Continuation of application No. 10/647,081, filed on Aug. 21, 2003, now abandoned, which is a continuation of application No. 09/840,653, filed on Apr. 23, 2001, now abandoned.

(51) Int. Cl.
*G21C 9/00* (2006.01)
*B63B 21/00* (2006.01)
*E02D 23/02* (2006.01)

(52) U.S. Cl. ........ 376/317; 376/912; 376/909; 376/284; 114/230.1; 114/230.2; 114/230.24; 405/205

(58) Field of Classification Search ................ 376/317, 376/909, 264; 114/230.1, 230.2, 230.24; 405/205
See application file for complete search history.

(56) References Cited

U.S. PATENT DOCUMENTS

| | | | |
|---|---|---|---|
| 2,682,235 A | 6/1954 | Buckminster | |
| 2,743,224 A * | 4/1956 | Ohlinger | 376/282 |
| 3,087,883 A | 4/1963 | Haftke | |
| 3,115,450 A | 12/1963 | Schanz | |
| 3,118,818 A | 1/1964 | Bray | |
| 3,154,039 A | 10/1964 | Knapp | |
| 3,164,525 A | 1/1965 | Wetch et al. | |
| 3,258,403 A * | 6/1966 | Malay | 376/250 |
| 3,486,343 A | 12/1969 | Gibson et al. | |
| 3,537,910 A * | 11/1970 | Estrada, Jr. et al. | 376/320 |
| 3,547,778 A | 12/1970 | Flaherty et al. | |
| 3,550,385 A | 12/1970 | Hill et al. | |
| 3,589,133 A | 6/1971 | Lowd et al. | |
| 3,686,875 A | 8/1972 | Morgan | |
| 3,810,336 A | 5/1974 | Sadao | |
| 3,840,431 A | 10/1974 | Devin et al. | |
| 3,897,271 A * | 7/1975 | Kim | 136/202 |
| 3,986,367 A | 10/1976 | Kalpins | |
| 4,088,535 A | 5/1978 | Thompson et al. | |
| 4,240,613 A | 12/1980 | Braithwaite | |
| 4,302,291 A | 11/1981 | Severs et al. | |
| 4,491,437 A | 1/1985 | Schwartz | |
| 4,506,609 A | 3/1985 | Fuss et al. | |

(Continued)

OTHER PUBLICATIONS

Parallel, definition thereof, pp. 1 to 6 available @ http://dictionary.reference.com/browse/parallel, last accessed Jan. 8, 2007.*

(Continued)

*Primary Examiner* — Mary Cheung
*Assistant Examiner* — Daniel L Greene, Jr.
(74) *Attorney, Agent, or Firm* — Gazdzinski & Associates, PC (57) ABSTRACT

The Seafloor Power Station is one or more unmanned electric power generating Units (2) sending power to and operated from existing coastal sites by a manned facility (1) by connecting lines and hoses (3) delivering power to a grid by lines (4). Each Unit's hull (11) maintained in a vacuum, contains both nuclear steam and electricity generating systems. The hull functions as overpressure containment and as condenser in the event of a loss of coolant accident or other steam release. The Units operate submerged in very cold water, with depth set by remotely controlled vertical mooring systems, mounted on gravity mats (27). A Unit must be surfaced by its mooring system to refuel the reactor, an action both conspicuous and public, enabling international oversight of the fuel disposition.

14 Claims, 8 Drawing Sheets

U.S. PATENT DOCUMENTS

| | | | |
|---|---|---|---|
| 4,576,519 | A | 3/1986 | Mast et al. |
| 4,620,820 | A | 11/1986 | Collipp |
| 4,679,361 | A * | 7/1987 | Yacoe .......................... 52/81.1 |
| 4,799,825 | A | 1/1989 | Myerhoff et al. |
| 4,949,540 | A | 8/1990 | Wich |
| 5,095,841 | A | 3/1992 | Santos et al. |
| 5,247,553 | A | 9/1993 | Herring |
| 6,012,873 | A | 1/2000 | Copple et al. |
| 6,347,910 | B1 | 2/2002 | Morishige |

OTHER PUBLICATIONS

How Submarines Work, Freudenrich et al., pp. 1 to 9 of 9, available @ http://people.howstuffworks.com/submarine.htm/printable, last accessed Jan. 8, 2007.*

Submarine, pp. 2285-2289, How it works, The illustrated Science and Invention Encyclopedia International Edition, vol. 17, Published by H.S. Stuttman Inc. Westoport Connecticut. Copywright Marshal Cavendish Limited 1974, 1976, 1977, 1983.*

WTEC (World Technology Evaluation Center) article entitled "Energy and Power Systems" published Jun. 1994, available at http://www.wtec.org/loyola/subsea/c3_s2.htm.

"The Buckyball: An Excruciatingly Researched Report" by Craig Segawa, May 8, 1999, available at http://www.Insite.com.br/rodrigo/bucky/buckyball.txt.

H.E. Braun et al., "Making the most of modular design: the Nupack 600MWe PWR", Mar. 1984, Nuclear Engineering International, pp. 36-39.

Richard S. Orr et al., "Offshore Nuclear Power Plants", 1973, Nuclear Engineering and Design 25, North-Holland Publishing Co., pp. 334-349.

* cited by examiner

SEAFLOOR POWER STATION

This application is a continuation of co-owned and U.S. patent application Ser. No. 10/647,081 filed Aug. 21, 2003 now abandoned of the same title, which is a continuation of co-owned and U.S. patent application Ser. No. 09/840,653 filed Apr. 23, 2001 now abandoned and entitled "A SEAFLOOR POWER STATION", each of which are incorporated herein by reference in their entirety.

BACKGROUND OF THE INVENTION

This invention relates to electric power generating stations, and more particularly to a deeply submersible, and surfacable, condensing containment system for a nuclear powered electricity generator.

For the past three decades proposals were developed for siting nuclear power plants offshore to take advantage of the virtually limitless supply of cooling seawater and available seafloor real estate. These sites also satisfied the goal of removing power plants from population centers, yet could be closer to urban areas than could be achieved by siting in rural land areas.

One such proposal developed by Electric Boat was a slipway launched submarine plant to be emplaced on the seabed in 250 feet of water. It would have been manned through an access trunk from a platform above the sea's surface. Studies by Electric Boat showed the concept to be technically feasible and economically competitive with plants of similar size on land. A vessel colliding with the ever present trunk would have flooded this access and isolated the plant.

Offshore Power Systems, a joint venture between Westinghouse and Newport News Shipbuilding, developed, but did not build a barge mounted nuclear powerplant for shipyard construction and subsequent mooring within a cofferdam. Construction of this cofferdam would have required substantial dredging of the continental shelf and was widely opposed by local, environmental, fishing and shipping interests.

In the early 1980's, U.S. Pat. No. 4,302,291 was issued for an underwater nuclear power plant structure of three joined 150 foot spheres permanently moored by means of flexible cable several hundred feet beneath the surface. It was to be stabilized by an inverted, ballasted kingpost and backup dynamic positioning equipment. An alternative siting method was a pile foundation, stabilized by an automatic ballast and trim system. The spheres inner shell is two inch steel, overlaid by a 6½ foot thick shell of ferroconcrete. A personnel airlock/decompression chamber (136) serves for access and resupply by submersible service vessels. In an emergency, this chamber can be detached for a free ascent, by means of explosive bolts. In the event of a loss of coolant accident (LOCA) or steamline break, the increase in pressure opens doors to allow steam to rise through ice baskets (156) condensing the steam.

More recently, U.S. Pat. No. 5,247,553 was issued covering a "Submerged Passively-Safe Power Plant" that uses seawater to cool the reactor compartment in an emergency: seawater, guided between a double hull, would cool the 100 mm/4" thick, 1634 square meter inner hull, and the reactor within. A suddenly isolated 600 MWe reactor at full power would produce over 1800 MWt, an incredible cooling load in excess of one million watts for each square meter of the inner hull. Peak temperatures in the fuel rods under such conditions would be disastrous.

Thus the limitations apparent in the prior proposals require further evolution if these offshore sites are to be utilized. To gain acceptance and succeed economically, a submerged generating application must greatly improve personnel safety and accessibility, and also decrease complexity and environmental impact over the prior proposals. The present invention is unmanned, surfacable, compact, and unintrusive.

SUMMARY OF THE INVENTION

This is a coastal electric power generating station with submerged generating Units sending power to, and operated from, a manned surface facility. The connecting lines and hoses could use existing outfalls, usually found at generating stations and waste water treatment plants, with the facility located within the plant. This facility would include control, pump and support rooms, with transformer, vacuum tank and standby generator areas adjacent. Most of these plants have an existing right of way for high voltage access.

Each Unit consists of a gravity mat as anchor, with an installed vertical mooring system, submerging an unmanned hull, housing nuclear steam and electricity generators. This hull serves as overpressure containment and as the condensing surface in the event of a loss of coolant accident or any other steam release. To condense such steam, a thin shelled, welded steel hull is used. Relatively small intersecting domes form the shell, supported by a frame of identical beams and tubes interconnected to support columns. All columns free flood through open tubes to suppress thermal expansion.

The hull's structural columns support foundations for the massive tonnage of the nuclear reactor, turbine generator plant and condensers, along with feedwater and radwaste components. All are enclosed within the hull and operated from the remote controlroom. All emergency power if offsite power is lost is provided by the onboard Class 1E dc power system.

The unmanned hull's interior would be in an effective vacuum during operation, to remove gasses from all components, including the condensers, and to provide the initial sealing of the hatch cover. Several beneficial effects occur from placing the interior in a vacuum: (1) air is excluded from the steam system; (2) the vacuum eliminates convection cooling of components, and; (3) the vacuum minimizes oxidation of components, electrical arcing and fire hazards. The hull would be maintained in a vacuum by hoses leading to vacuum tanks at the facility; these hoses also serve as conduits for the control circuits.

Installation of the Unit would start with sinking a gravity mat, with the installed winches' hydraulic hoses connected to the pumproom and the buoys lashed together. The winches cables would be paid out as the mat sank, positioning the buoys to keep the mat upright. Up and down cycling by the tension equalizing mooring system would first surface and then level the buoys if the mat was not level.

Later, the hull would be towed to the site; attached to buoys and circuits; fueled, evacuated, buoys flooded and ballasted; and then submerged. The vertical cables would minimize hull movement if the anchoring mat experienced seismic shaking. The Unit would be activated to produce electricity as required, for the reactor's two year fuel cycle.

The mooring system reverses to surface the hull, without deballasting, for fueling and routine servicing; or the hull could be defueled and dewatered into a service barge and unmoored for delivery to a drydock.

In a catastrophic compounding of events starting with a major loss of coolant; followed by the reactor failing to shut down; and then failure of all standard emergency systems, the result could be a dry, hot core. As steam escapes and condenses on the inside of the hull, reactor pressure would be rapidly reduced to below external sea pressure. If such a disastrous sequence occurred in this hull, an inflow of seawater through check valves to the core spray sparger would cool the reactor. If the reactor could not be shut down, the hull would fill by this inflow, but contained therein.

DETAILED DESCRIPTION OF THE INVENTION

Figure 1:
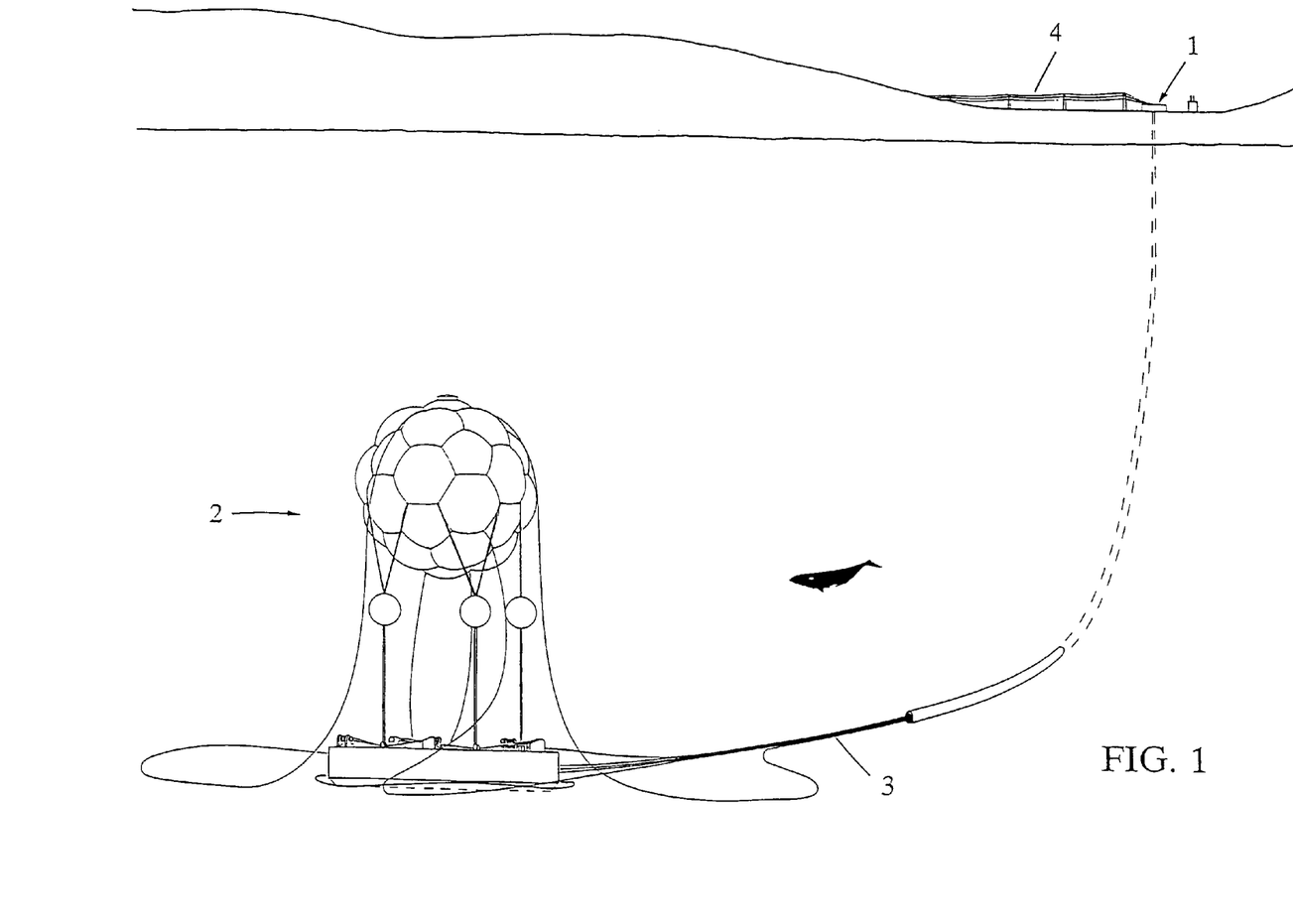
FIG. 1 is an elevation of a seafloor power station.

Referring now to the drawings, FIG. 1 is a single point perspective of a seafloor power station showing a manned shore facility (1) with control, hydraulic pump and other support rooms in a building with transformers, vacuum tanks and standby generators adjacent. One Unit (2) is shown through the water on the seafloor. Electric lines and hoses (3) to the facility deliver power from the Units' generators, operate the mats' winches from the pumproom, and maintain a vacuum in the hull; the vacuum hoses also serve as conduits for fibre optic and other control circuits.

Lines (4) from the transformers send power to a high voltage grid. If the Units are farther offshore, economics may indicate locating the facility on an island or platform, from which only the high voltage lines would go ashore.

Figure 2:
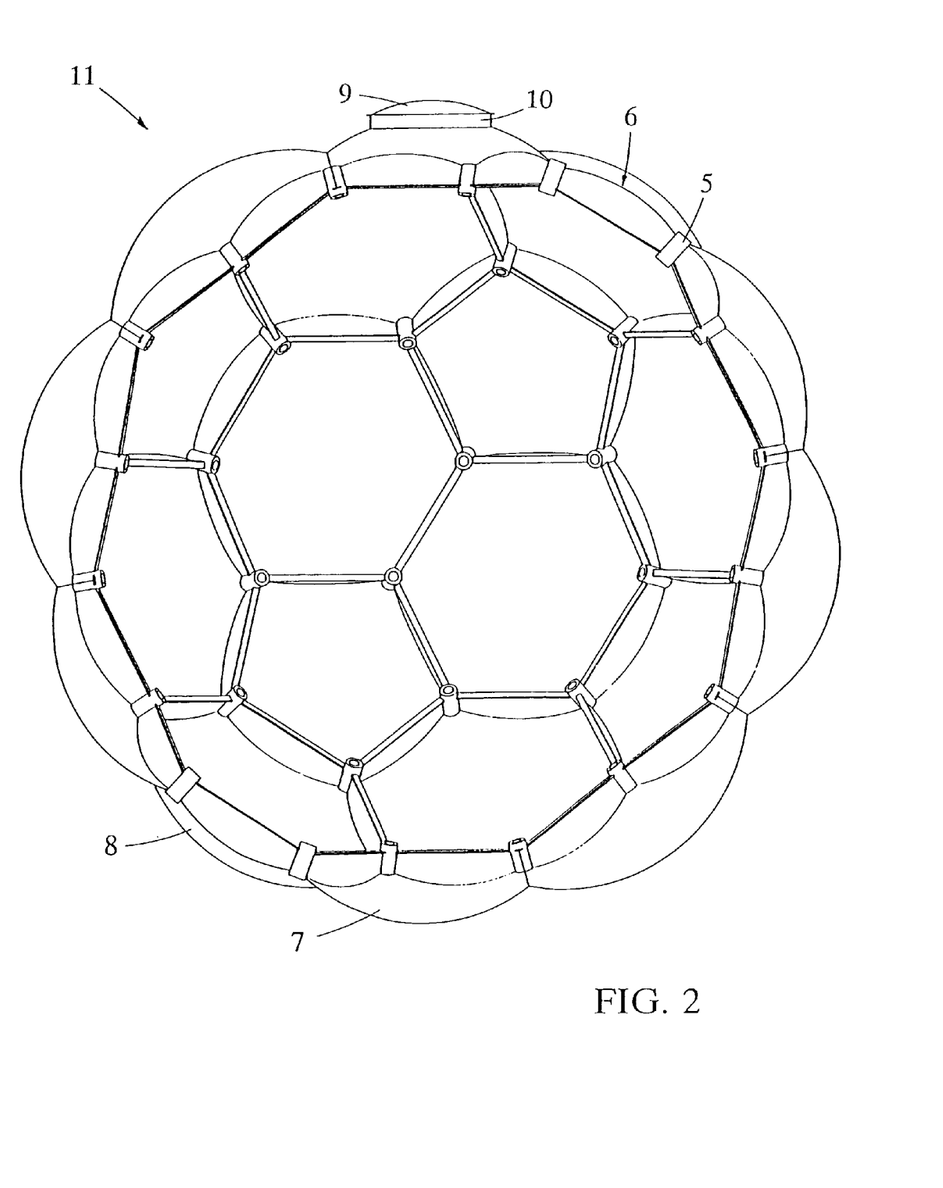
FIG. 2 is a half section of the hull structure.
Figures 3, 4:
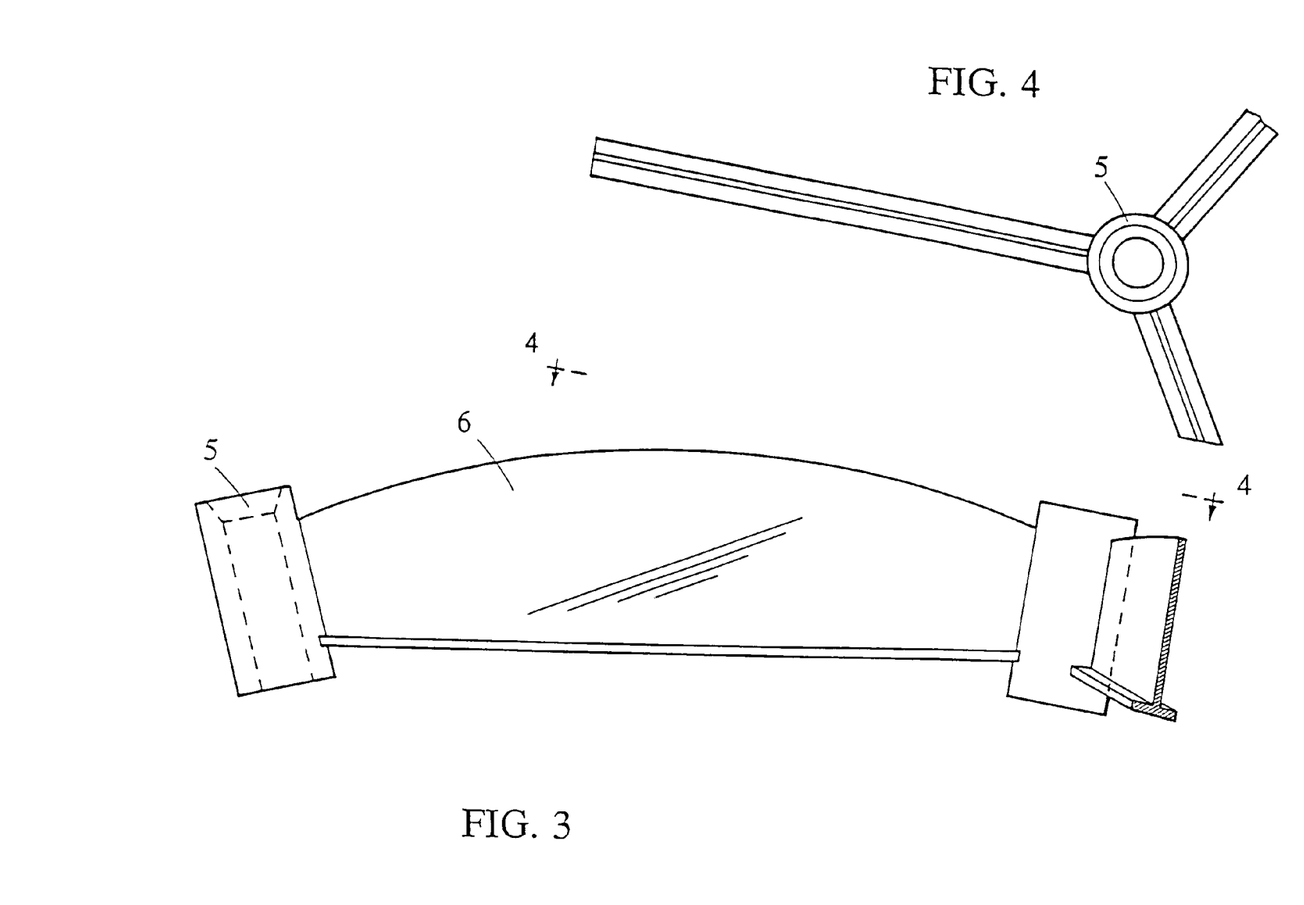
FIG. 3 is the concept of a standard structural beam with two attached tubes.
FIG. 4 is the exterior view of all sixty intersections showing the end of a tube with three attached beams, before the shell is attached.

FIGS. 2-4 show the steel hull (11) structure in half section and detail, with sixty radially oriented tubes (5) with ninety standard beams (6) twelve pentagon based domes (7) and twenty hexagon based domes (8). The detailed beam would be more complex, such as a stiffened box beam. The beam and tube structure carry the overall pressure load allowing the relatively small domes to be thinner than the shell of any equally large pressure hull. This thinness enables the stainless clad domes to transfer heat to seawater and thus condense steam releases.

The round hatch cover (9) is initially vacuum sealed by opening valves to the vacuum tanks, then locked by water pressure onto a flanged coaming (10) and does not require mechanical latching. A quickly applied partial vacuum adds to the cover's weight a uniform compression force, of over 90 tonnes. The larger exterior area prevents the smaller interior face from lifting during any overpressure conditions, at all operating depths.

Figure 5:
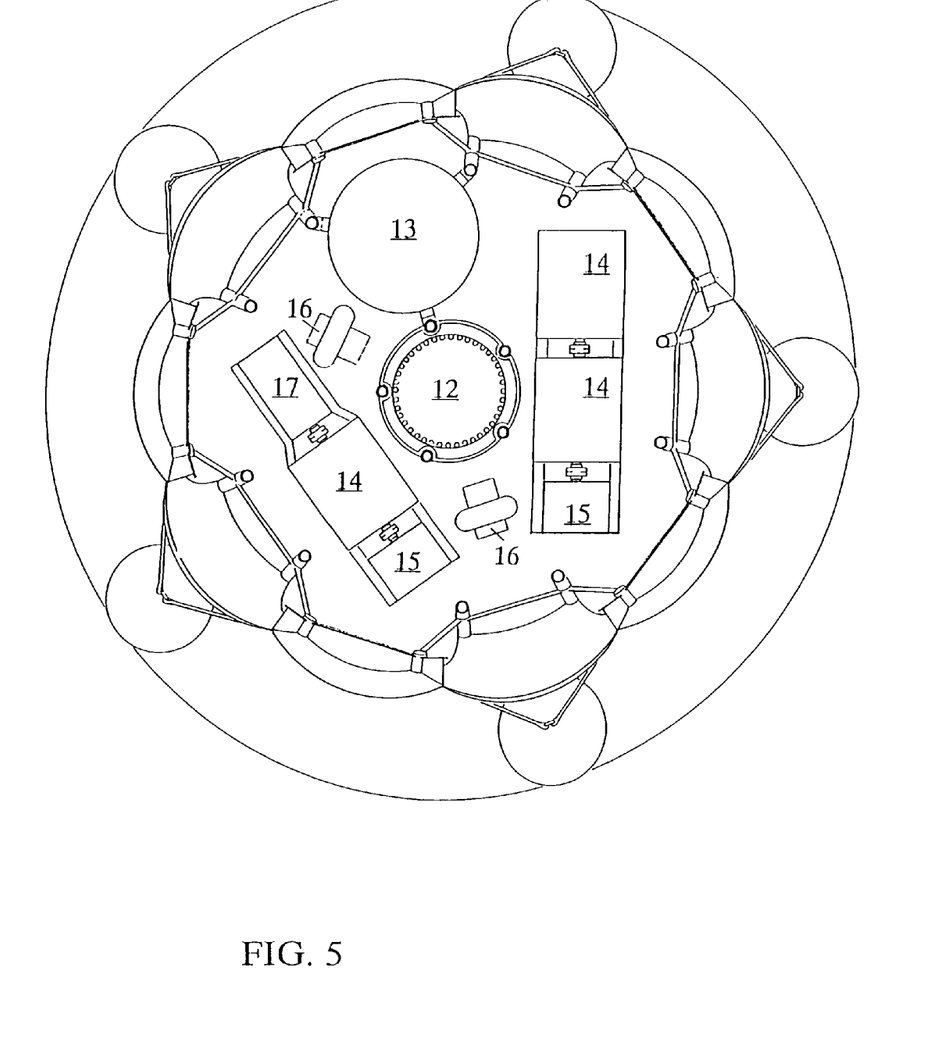
FIG. 5 is a section at the equator of a generating Unit's hull showing the principal machinery arrangement.
Figure 6:
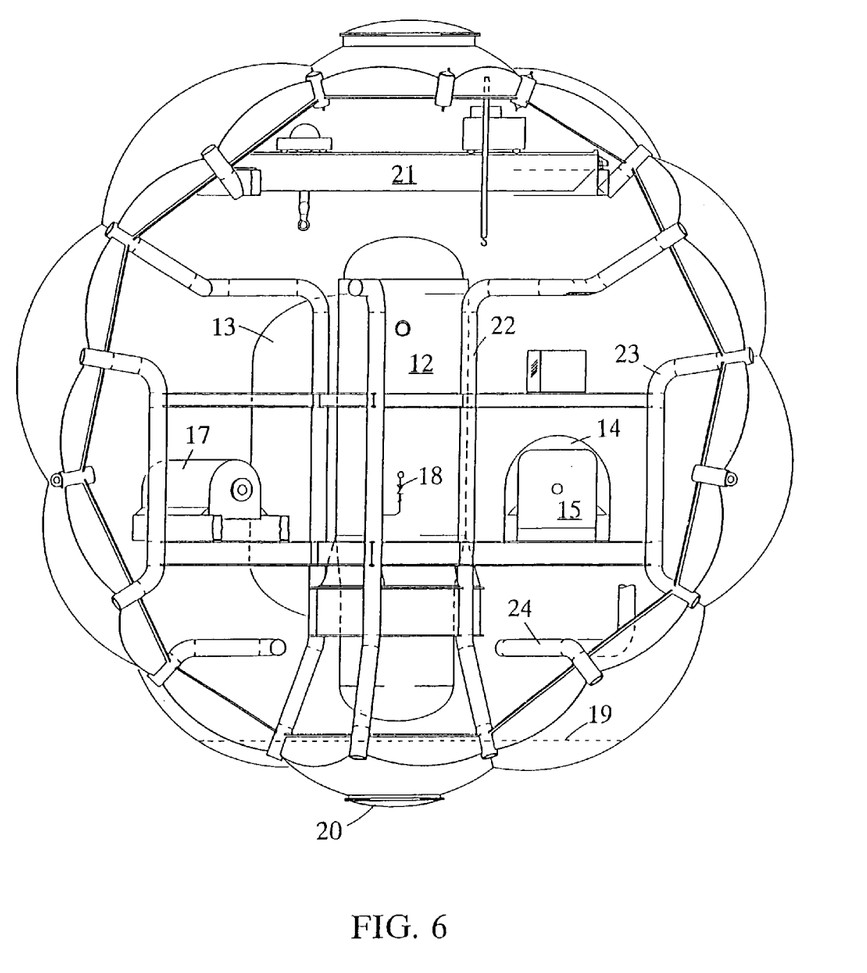
FIG. 6 is a cutaway elevation of a generating Unit's hull corresponding with the section at the equator.

FIG. 5 depicts the principal machinery arrangement in plan, and FIG. 6 in elevation. A steam generator, similar to a 600 MWe SBWR (12) is at the center, ringed by a condenser (13) with intakes (24) and, on a platform, three LP turbine sections (14) two electricity generators (15) two turbofeed pumps (16) and a HP/IP turbine section (17). An alternative is the smaller, AP600 (MWe) reactor and steam generators with fewer turbine sections.

Structural pipe columns connected to open tubes are cooled by internal seawater flow to suppress thermal expansion. The reactor is supported by five columns (22) the outer platforms by ten columns (23). A seawater line from a column is shown connecting to the reactor's core spray sparger through a check valve (18). If reactor coolant was lost, and replacement coolant flow failed, seawater would flood the reactor. The bottom is filled with water (19) with an access (20) added for servicing control rods in drydock if a SBWR is used. A polar crane with a refueling machine (21) is shown; an alternative would be removal of the reactor head and internals through the hatchway by floating crane, with a refueling machine brought in.

Figure 7:
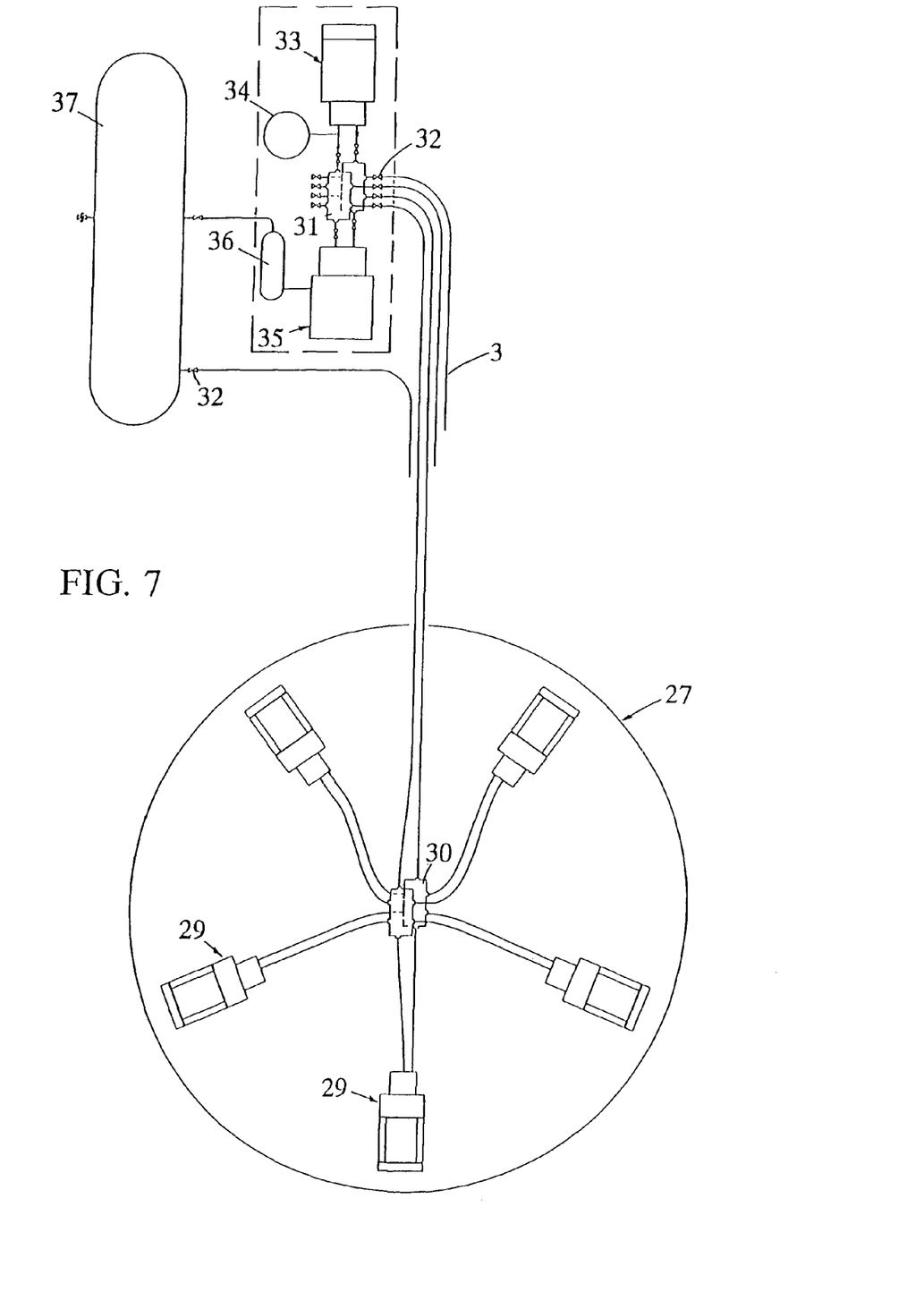
FIG. 7 is the tension equalizing mooring system's diagram.

FIG. 7 details the underwater valveless hydraulic system that allows flow to respond to mooring cable tensions on the hydraulically driven winches (29). As the facility's hydraulic pump unit (33) with accumulator (34) pumps through manifolds (31) and valves (32) to submerge a hull, additional flow from the submerged manifolds (30) on the mat (27) goes to the winchmotor most easily driven, balancing tensions on all cables. Only one underwater subsystem is shown; hoses (3) to a redundant winch subsystem are indicated. A winch from each subsystem mount on common frames and are cabled to the same buoys, as shown on sheet 8/8.

These winchmotors would be modified to also function as pumps, to enable reversing the winches to allow the very buoyant hull to surface. Opening valves (32) allows the winches to overhaul, pumping to a hydraulically driven air compressor (35) building air pressure in an isolated vacuum tank (37) through a filter/demister (36). The increasing air pressure increases flow resistance to offset the hull's tendency to accelerate. When surfaced, a valve (32) on the tank's vacuum line would be opened to ventilate the hull and release the hatch cover.

In the unlikely event that the hull was heeled from an unforeseen force, cable tension would increase on the high side as the buoyant force shifted to two pairs of cables. To avoid exceeding working loads on these cables, the affected winches would pump to winches with slack cables through the submerged manifolds (30). Once the heeling force was removed, inertia in the system would prevent the hull from fully righting. Briefly opening valves to the air compressor would let all winches pump and equalize tension, allowing the hull to right itself.

Figure 8:
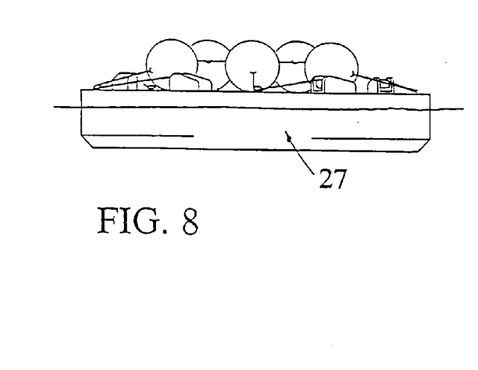
FIG. 8 is a clear water view of a round mooring mat afloat, with winches installed and buoys lashed to the deck.
Figure 9:
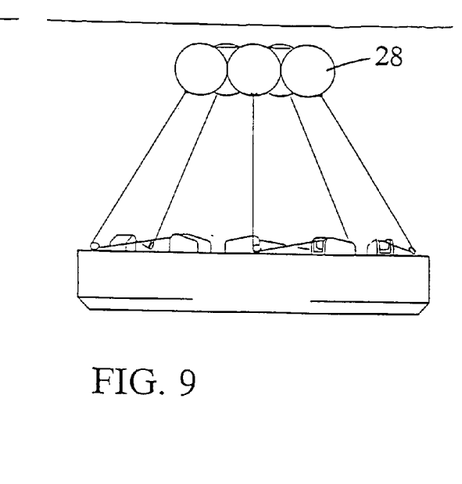
FIG. 9 shows a mat, flooded and dropping, kept upright by the buoys.
Figure 10:
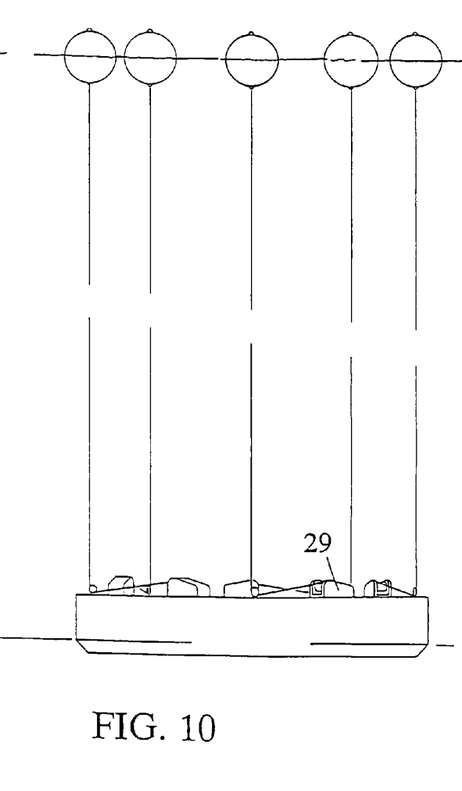
FIG. 10 depicts a mat emplaced and the buoys adjusted to the same draft.

FIG. 8 shows a round mooring mat (27) arriving at the site, with installed winches (29) whose cables are attached to buoys (28) lashed together. Depending on the design, the mat may require ballast added to firmly anchor the hull. Ballasting sand or any available heavy material could be pumped in, followed by water to sink. In FIG. 9 the mat is flooded and dropping, kept upright by the buoys, with the flat bottom slowing descent and decelerating from the ground effect prior to impact. FIG. 10 depicts a mat emplaced, the buoys surfaced and adjusted to the same draft by equalizing cable tension with up and down cycling of the winches.

Figure 11:
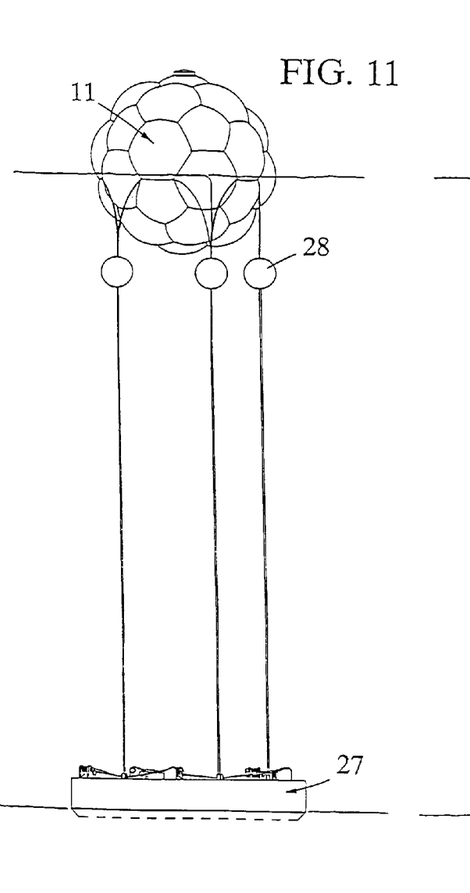
FIG. 11 shows a generating Unit's hull being attached to the five buoys.
Figure 12:
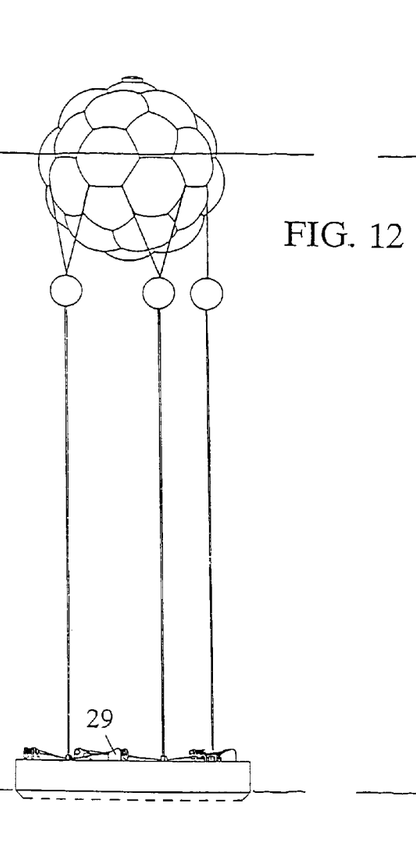
FIG. 12 follows with tankage in the hull, cables tight and buoys flooded.

Subsequently, FIG. 11 has a Unit's hull (11) being attached to the bridles of the five buoys (28) held submerged below the hull by the winches (29). (The high modulus polyethylene cables have a specific gravity of 0.97 and are shown floating; only three pairs and buoys show because of the orientation of the hull.) In FIG. 12 the buoys are flooded by opening valves and bridles hauled tight; with water, as coolant, condensate and ballast, in the hull.

Figure 13:
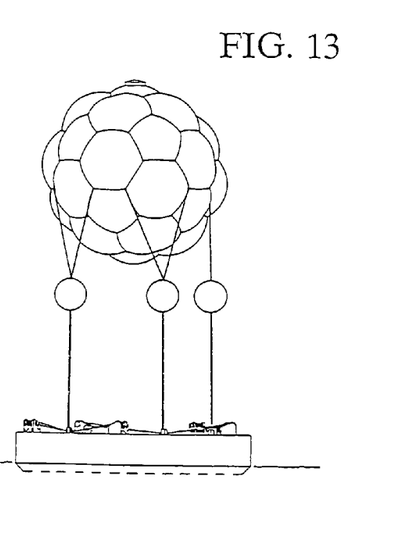
FIG. 13 depicts the Unit after ballasting the buoys and fueling the reactor.

FIG. 13 depicts the Unit (2) at operating depth, after ballasting the buoys through top hatches, and fueling the reactor. The flexibility of this vertical mooring system minimizes movement to the hull from any seismic shaking of the anchoring mat, as the parallel cables will dampen vertical, and not transmit horizontal motion. The hull can be surfaced by the hydraulic system for servicing; and could be defueled and dewatered in preparation for delivery to a drydock. Dumping ballast through the buoys' bottom hatches, assisted by water jets, and then expelling water with compressed air would allow surfacing the buoys to unmoor the hull for such delivery.

What is claimed is:

1. A coastal electric power generating station with one or more nuclear reactor powered generating units for operation and situation offshore on a floor of a large body of water, comprising:
   at least one unmanned buoyant submersible hull structure comprising a containment for nuclear steam and electricity generators;
   at least one mooring element removably attached to said at least one unmanned buoyant submersible hull structure, said at least one mooring element being adapted to moor said at least one unmanned buoyant submersible hull structure to said floor; and
   a surface facility disposed above and isolated by said large body of water from said at least one buoyant submersible hull structure and said at least one mooring element, said surface facility controlling the operation of said one or more nuclear reactor powered generating units including said at least one mooring element and said at least one unmanned buoyant submersible hull structure.

2. The station of claim 1, said at least one mooring element further comprising at least one seafloor element and at least one controllable restraining element mounted thereon,
   said at least one controllable restraining element being adapted to permit controlled variation of the relationship between said seafloor element and said buoyant submersible hull structure.

3. The station of claim 2, wherein said at least one seafloor element comprises a gravity mat; and
   said at least one controllable restraining element comprises at least one installed winch, vertical cable and buoy system.

4. The station of claim 3, wherein said at least one controllable restraining element comprises a plurality of said installed winch, vertical cable and buoy systems disposed around and within the periphery of said gravity mat and adapted to control said at least one buoyant submersible hull structure's ascent and descent.

5. The station of claim 1, further comprising a tensioning system for maintaining cable tension on a plurality of vertical cables removably attached to said buoyant submersible hull structure, comprising:
   a plurality of winches driven by, or reversely, driving a fluid, said winches being coupled to respective elements of said vertical cables,
   at least one pair of manifolds adapted to distribute said fluid under pressure to and between said plurality of winches;
   at least one hydraulic pump unit coupled to said at least one pair of manifolds, said at least one pump adapted to discharge said fluid under pressure to at least a portion of said winches for reeling in thereof; and
   at least one flow resisting subsystem coupled to said at least one pair of manifolds, said at least one flow resisting subsystem adapted to receive said fluid under pressure from said plurality of winches for reeling out thereof;
   wherein said fluid under pressure is distributed to and between said winches substantially in proportion to said tension placed on each winch by its respective cable.

6. The station of claim 5, wherein said fluid driven winches removably attached to said buoyant submersible hull structure are adapted for submerging said buoyant submersible hull structure and setting said buoyant submersible hull structure's operating depth.

7. The station of claim 5, wherein at least a portion of said winches are adapted to balance the tension applied to each said winch by its respective cable by driving fluid through said at least one pair of manifolds to or from other ones of said winches.

8. The station of claim 5, wherein said winches flow resistant subsystem is adapted to control the surfacing of said buoyant submersible hull structure.

9. The station of claim 1, wherein said at least one buoyant submersible hull structure containing nuclear steam and electricity generators comprises:
   a frame comprising a plurality of beams and tubes;
   said beams adapted to intersect and support partial domes forming the shell of said buoyant submersible hull structure; and
   said tubes interconnected to support a plurality of columns of said buoyant submersible hull structure;
   wherein all of said beams are of substantially the same size.

10. The station of claim 9, wherein said partial domes forming said shell of said buoyant submersible hull structure are smaller than said buoyant submersible hull structure.

11. The station of claim 9, wherein said partial domes transfer heat from the interior of said buoyant submersible hull structure to seawater.

12. The station of claim 9, wherein said plurality of tubes interconnected to support columns are open at both ends to free flood and allow warmed seawater to rise and exhaust.

13. A coastal electric power generating station with one or more nuclear reactor powered generating units for operation and situation offshore on a floor of a large body of water, comprising:
   at least one unmanned buoyant submersible hull structure comprising a containment for nuclear steam and electricity generators;
   at least one mooring element removably attached to said at least one unmanned buoyant submersible hull structure, said at least one mooring element being adapted to moor said at least one unmanned buoyant submersible hull structure to said floor via a plurality of cables and further adapted to balance the tension of said plurality of cables between said unmanned buoyant submersible hull structure and said mooring element; and
   control means to control one or more aspects of said unmanned buoyant submersible hull structure disposed above and isolated by said large body of water from said at least one buoyant submersible hull structure and said at least one mooring element.

14. A coastal electric power generating station with one or more nuclear reactor powered generating units for operation and situation offshore on a floor of a large body of water, comprising:
   at least one unmanned buoyant submersible hull structure comprising a containment for nuclear steam and electricity generators;

at least one mooring element attached to said at least one unmanned buoyant submersible hull structure, said at least one mooring element further comprising at least one seafloor element and at least one controllable restraining element mounted thereon, said at least one controllable restraining element being adapted to permit controlled variation of the relationship between said at least one seafloor element and said at least one unmanned buoyant submersible hull structure;

control means to control one or more aspects of said unmanned buoyant submersible hull structure disposed above and isolated by said large body of water from said at least one buoyant submersible hull structure and said at least one mooring element; and a tensioning system for maintaining cable tension on a plurality of vertical cables removably attached to said at least one unmanned buoyant submersible hull structure, comprising:

a plurality of winches driven by, or reversely driving, a fluid, and wherein each of said plurality of winches are coupled to respective elements of said vertical cables,     at least one pair of manifolds adapted to distribute said fluid under pressure to and between said plurality of winches;

at least one hydraulic pump unit coupled to said at least one pair of manifolds, said at least one pump adapted to discharge said fluid under pressure to at least a portion of said plurality of winches for reeling in thereof; and     at least one flow resisting subsystem coupled to said at least one pair of manifolds, said at least one flow resisting subsystem adapted to receive said fluid under pressure from said plurality of winches for reeling out thereof;

wherein said fluid under pressure is distributed to and between said plurality of winches substantially in proportion to said tension placed on each of said plurality of winches by its respective cable;

wherein at least a portion of said plurality of winches are adapted to balance the tension applied to each of said winches by its respective cable by driving fluid through said at least one pair of manifolds to or from other ones of said plurality of winches.

\* \* \* \* \*